United States Patent
Moore et al.

(10) Patent No.: US 6,205,518 B1
(45) Date of Patent: Mar. 20, 2001

(54) APPARATUS AND METHOD FOR REDUCING POWER CONSUMPTION IN A DATA PROCESSOR EXECUTING AN APPLICATION CODE

(75) Inventors: William P. Moore, Winooski; Sebastian T. Ventrone, South Burlington, both of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/129,731

(22) Filed: Aug. 5, 1998

(51) Int. Cl.[7] .............................. G06F 13/16; G06F 13/14; G06F 9/30; G06F 1/04
(52) U.S. Cl. .......................... 711/118; 710/260; 711/118; 712/213; 713/500
(58) Field of Search ............................. 711/118; 712/210, 712/213, 211, 32; 713/503, 300, 500; 710/260, 129

(56) References Cited

U.S. PATENT DOCUMENTS

| | | | |
|---|---|---|---|
| 4,615,005 | 9/1986 | Maejima et al. | 364/200 |
| 5,220,672 | 6/1993 | Nakao et al. | 395/750 |
| 5,396,634 | * 3/1995 | Zaidi et al. | 712/211 |
| 5,428,790 | 6/1995 | Harper et al. | 395/750 |
| 5,557,557 | 9/1996 | Frantz et al. | 364/578 |
| 5,560,024 | 9/1996 | Harper et al. | 395/750 |
| 5,598,566 | 1/1997 | Pascucci et al. | 395/750 |
| 5,623,677 | 4/1997 | Townsley et al. | 395/750 |
| 5,675,808 | 10/1997 | Gulick et al. | 395/750 |
| 5,740,411 | * 4/1998 | Hearn et al. | 713/503 |
| 5,826,053 | * 10/1998 | Witt | 712/210 |
| 5,964,884 | * 10/1999 | Partovi et al. | 713/503 |
| 5,970,235 | * 10/1999 | Witt et al. | 712/213 |
| 5,974,505 | * 10/1999 | Kuttanna et al. | 711/118 |

* cited by examiner

Primary Examiner—Daniel H. Pan
Assistant Examiner—Te Yu Chen
(74) Attorney, Agent, or Firm—John J. Goodwin

(57) ABSTRACT

Apparatus and methods are described for reducing power consumption in a processor. The processor includes a source of microcode instructions, a microcode instruction decode circuit, control register latches and a clock gate control circuit that is coupled to the source of microcode instructions. The clock gate control circuit searches and picks groups of clock gate control signals for the latches that are the same value (state) as control signals form a previous cycle. The clock gate control circuit includes a table, a table lookup circuit, a storage circuit, a compare circuit and a latch prevent circuit

5 Claims, 3 Drawing Sheets

APPARATUS AND METHOD FOR REDUCING POWER CONSUMPTION IN A DATA PROCESSOR EXECUTING AN APPLICATION CODE

BACKGROUND OF THE INVENTION

1. Field of the Invention

The present invention relates to apparatus and methods for reducing power consumption in a processor, and more particularly to circuits for reducing power consumption while a processor is executing an application code.

2. Background Art

Power management for processors is a significant consideration, particularly for portable computers where a battery provides the power. Techniques for conserving battery charge by low power operation generally involves power minimizing AC power consumption and standby power consumption. The primary method of driving the AC power has been through the use of low power circuits and technology permitting lower values of VDD. U.S. Pat. No. 4,615,005 issued Sep. 30, 1986 to Maejima et al. entitled DATA PROCESSING APPARATUS WITH CLOCK SIGNAL CONTROL BY MICROINSTRUCTION FOR REDUCED POWER CONSUMPTION AND METHOD THEREFOR discloses a method of controlling the supply of a clock signal to a logic circuit composed of CMOS gates for further reducing the power consumption by using a clock signal supply inhibit instruction.

U.S. Pat. No. 5,220,672 issued Jun. 15, 1993 to Nakao et al. entitled LOW POWER CONSUMING DIGITAL CIRCUIT DEVICE discloses a method for decreasing the power consumption of a digital circuit by interrupting the switching created by clock pulses and maintaining the system in a quiescent state.

U.S. Pat. No. 5,428,790 issued Jun. 27, 1995 to Harper et al. entitled COMPUTER POWER MANAGEMENT SYSTEM discloses a system for low power management for a portable computer that powers down various sections of the computer when they are not used.

U.S. Pat. No. 5,557,557 issued Sep. 17, 1996 to Frantz et al. entitled PROCESSOR POWER PROFILER discloses a method for determining the energy consumption of a processor when executing a program.

U.S. Pat. No. 5,560,024 issued Sep. 24, 1996 to Harper et al. entitled COMPUTER POWER MANAGEMENT SYSTEM discloses a system for low power management for a portable computer that powers down various sections of the computer when they are not used.

U.S. Pat. No. 5,598,566 issued Jan. 28, 1997 to Pascucci et al. entitled NETWORKED FACILITIES MANAGEMENT SYSTEM HAVING A NODE CONFIGURED WITH DISTRIBUTED LOAD MANAGEMENT SOFTWARE TO MANIPULATE LOADS CONTROLLED BY OTHER NODES discloses a networked system applicable for facilities management that limits energy consumption using stored restoration characteristics of loads controlled by nodes.

U.S. Pat. No. 5,623,677 issued Apr. 22, 1996 to Townsley et al. entitled APPARATUS AND METHOD FOR REDUCING POWER CONSUMPTION A COMPUTER SYSTEM discloses a method and apparatus for reducing power consumption in a computer system where a program is used to determine when the processor is in an inactive state to cause clocking signals and the power supply to be disabled.

SUMMARY OF THE INVENTION

An object of the present invention is to provide a power reduction means for a processor including a microcode decoder unit for receiving and decoding microinstructions and generating decode data in response to the microinstructions.

Another object of the present invention is to provide a power reduction means for a processor including a microcode decode unit for generating decode data and a plurality of latches for receiving the decode data.

Still another object of the present invention is to provide a processor further including a clock gate control unit for receiving microinstructions simultaneously with a decode unit and coupled to a plurality of latches for controllably clocking the latches.

A still further object of the present invention is to provide a power reduction means for a processor to reduce power while the processor is executing application code.

Other features, advantages and benefits of the present invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention and, together with the description, serve to explain the principles of the invention in general terms. Like numerals refer to like parts throughout the disclosure.

DESCRIPTION OF THE INVENTION

Figure 1:
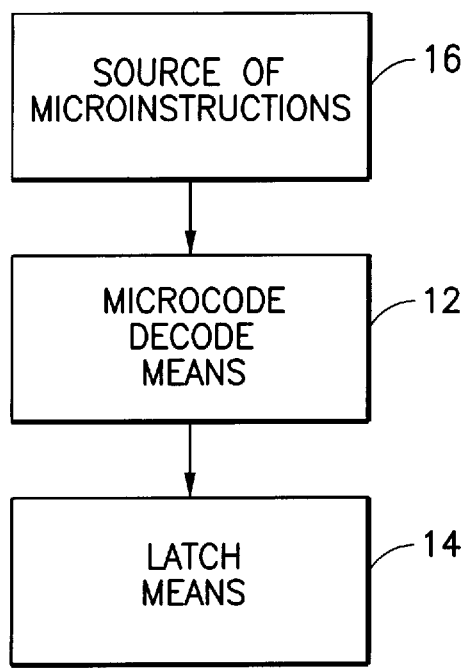
FIG. 1 is a schematic block diagram of an embodiment of a processor as known in the prior art including a source of microcode instructions, a microcode instruction decode means, and a latch means.

Referring to FIG. 1, an embodiment of a microcode decode processor as known in the prior art is shown including a source of microinstructions 10 that provides input instructions occurring in cycles, each instruction including bits of microcode. A microcode decode unit 12 is coupled to the source of microinstructions and decodes the instruction for each input cycle. Decode means 12 decodes the microinstructions and provides data to the system control registers. The output signals from decode means 12 sets all the latches of the system control registers for each cycle of microinstructions from source of microinstructions 10.

Latch means 14 is coupled to decode means 12 and contains a plurality of latches that are clocked and set for each cycle in accordance with the decoded instruction.

The decode processor is a pseudo microcode processor, that is, for every cycle the microcode generates a set value for the latches. These values will then propagate through the system. In the prior art, the latches are set for the bits of each cycle of decoded instructions irrespective of the settings of the previous instruction. Because the values for the latch settings are random and can not be predicted, instructions in a cycle will be provided for particular settings of many latches, which latches may have been set in the same settings in the previous cycle. Thus the settings of the particular latches are not necessary and cause a reduction of battery power, especially in processor designs requiring many control latches.

Figure 2:
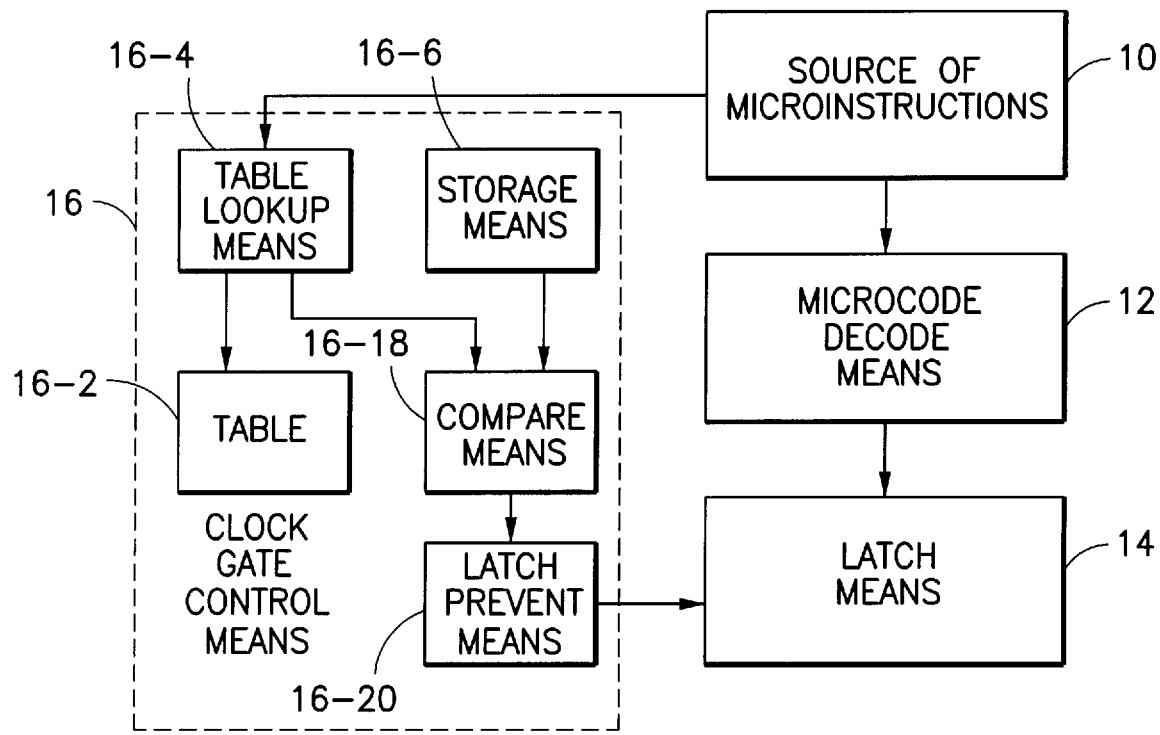
FIG. 2 is a schematic block diagram of an embodiment of a processor according to the present invention including a source of microcode instructions, a microcode instruction decode means, a latch means, and further including a clock gate control unit.

Referring to FIG. 2, an embodiment of a processor according to the present invention is shown including the source of microinstructions 10, the microcode decode means 12 and the latch means 14 as described for FIG. 1, as well as a clock gate control means 16 that is coupled to source of microinstructions 10.

The function of clock gate control means 16 is to search and pick groups of clock gate control signals for latches that are the same value (state) as control signals from a previous cycle. Clock gate control means 16 includes a table 16–2, a table lookup means 16–4, a storage means 16–6, a compare means 16–8 and a latch prevent means 16–10.

Clock gate control means 16 receives the microinstructions from source 10 simultaneously with decode means 12 and has its output coupled to latch means 14 for controllably clocking the latches such that setting instructions are not sent to latches that have been placed in the same setting during the previous cycle of microinstructions.

Clock gate control means 16 includes a storage device containing a table 16–2 for storing and identifying a group of microinstructions that have a portion of their control bits set identically to corresponding portions of others of the group of microinstructions.

A table lookup means 16–4 is connected to table 16–2 for determining whether a microinstruction received from source of microinstructions 10 is a member of the group of microinstructions that have a portion of their control bits identically set to corresponding portions of others of the group of microinstructions. Table lookup means 16–4 includes means for setting a membership bit to "true" if the received micro instruction is a member of the group.

Clock control gate means 16 further includes a storage means 16–6 for storing a membership bit corresponding to a previously received microinstruction from a previous cycle, a compare means 16–8 for comparing a membership bit corresponding to the received microinstruction with the membership bit corresponding to a previously received microinstruction, and a latch prevent means 16–10 connected to the latches in latch means 14 for providing a signal for preventing the clocking of those latches related to pairs of "true" membership bits that matched in the compare means 16–8.

Figure 3:
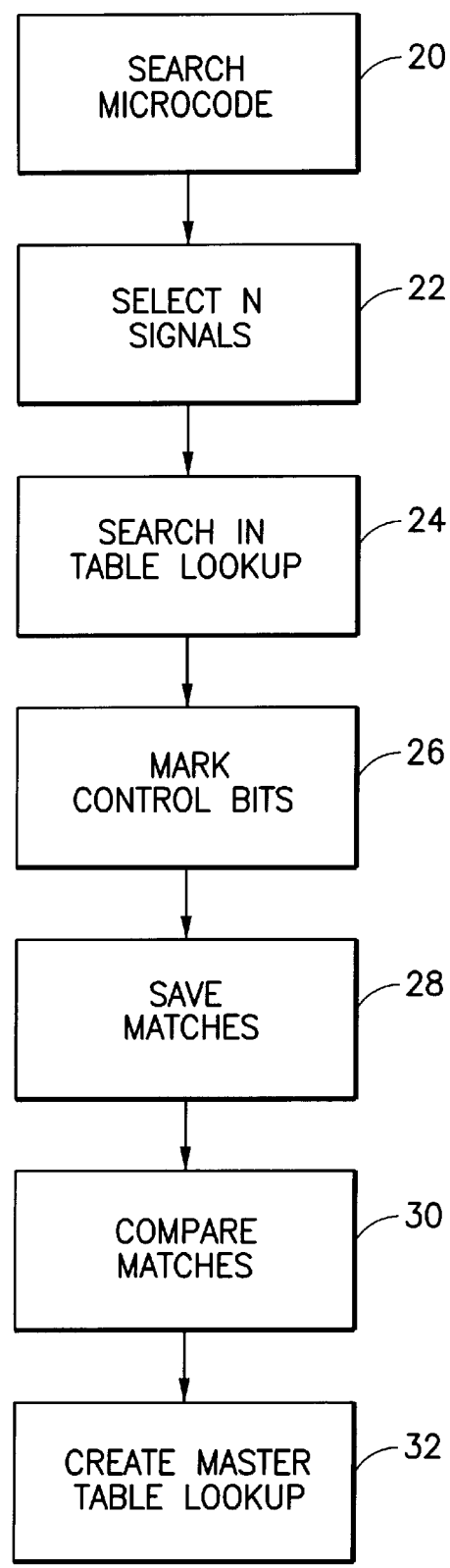
FIG. 3 is a schematic illustration of a flow chart of the method employed in the present invention.

Referring to FIG. 3, a flow chart is shown that describes the method of clock gate signal control according to the present invention.

In the first step of block 20, a search is performed of the microcode for each instruction. In the second step of block 22 a number "N" such as 16 signals are picked or selected and in the third step of block 24 all the microcodes are searched in the table lookup means to see if they are at the same value as the N signals selected in step 22. In the fourth step of block 26 temporary control bits are marked or designated for all the microcode matches.

In the fifth step of block 28 the microcode matches are saved in the storage means and then in the sixth step of block 30 a compare is performed in the compare means and the percentage of the matches are found to determined if the percentage of the matches is above an accepted level. Finally, in the seventh step of block 32 the lookup table is created with all of the microinstructions and their corresponding group settings.

Figure 4:
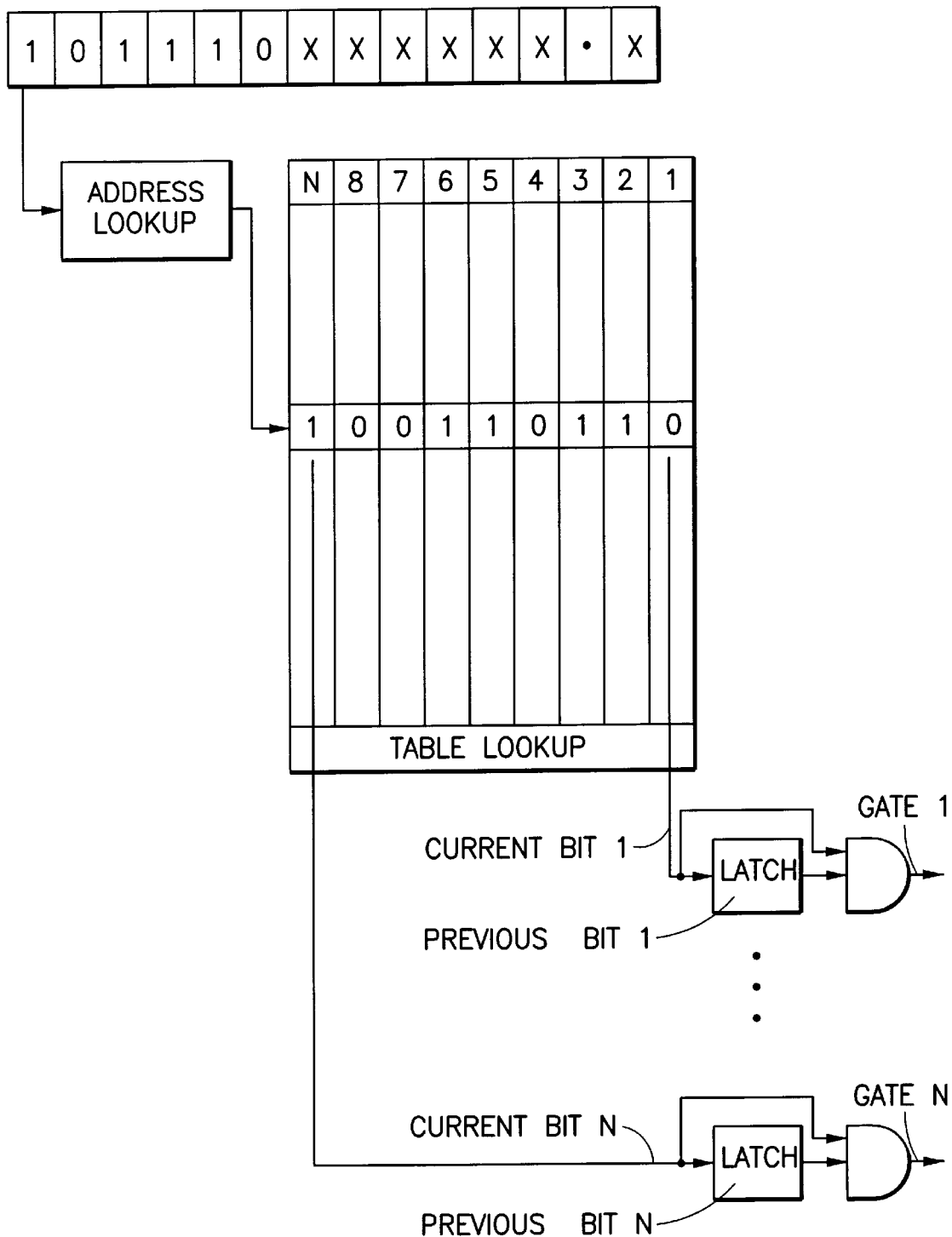
FIG. 4 is an example of the operation of the present invention for a typical opcode.

Referring to FIG. 4, an example is illustrated describing the present invention wherein an add1 opcode is dispatched as a microinstruction. The table lookup means decodes the opcode entry point to an entry point dedicated to the add instruction. A bit is set for every group of registers that can be clocked gate via this mechanism. For the add1 opcode, the corresponding current 1-N current cycle settings are set by the table lookup means. The previous cycle latched versions are then compared to the current value. If the signals match, then the group of latches are the same value from the previous cycle and the group of latches can be clocked gate.

What has been described is an improved processor wherein, for each cycle of microinstructions input a comparison is performed in a clock gate control unit to determine whether a portion of the control bits of the input instructions have states that match with a portion the control bits of previously received microinstructions. When such matches are determined, the latches of the system control registers are prevented from clocking because they are already in the desired state. Thus there is a considerable power saving gained by not clocking the latches in the registers.

While the invention has been described in connection with a preferred embodiment, it is not intended to limit the scope of the invention to the particular form set forth, but on the contrary, it is intended to cover such alternatives, modifications and equivalence as may be included within the spirit and scope of the invention as defined in the appended claims.

What is claimed is:

1. A processor comprising:

a microcode decode unit for receiving and decoding cycles of microinstructions consisting of a plurality of binary bits, and generating decode data consisting of a plurality of binary bits in response thereto;

a plurality of latches coupled to the decode unit for receiving the decode data wherein said latches are set in accordance with the binary bits of the decode data;

a clock gate control unit receiving said microinstructions simultaneously with the decode unit and coupled to the latches for controllably clocking selected ones of the latches, the control unit including:

a table identifying a group of said plurality of binary bits of each of said received microinstructions that have a portion of their control bits set identically to corresponding portions of others of said group of binary bits of said received microinstructions;

table lookup means for determining whether the binary bits of a received microinstruction is a member of said group of microinstructions that have a portion of their control bits identically set, including means for setting a membership bit of said group to "true" if the membership bit of the received microinstruction is a member of said group;

storage means for storing a membership bit corresponding to a previously received microinstruction;

compare means for comparing a membership bit corresponding to the received microinstruction with the membership bit corresponding to a previously received microinstruction; and means for preventing clocking corresponding ones of the plurality of latches in response to a pair of "true" membership bits matching in the compare means.

2. A processor according to claim 1 wherein the table lookup means decodes the received microinstruction entry point to an entry point dedicated to the microinstruction, and a bit is set for every group of registers that can be clocked gate for the current cycle settings, and wherein the compare means compares the previous cycle latch values to the current value.

3. A method for controlling clock gate signals in a microcode instruction signal processor comprising the steps of:

step 1) receiving and decoding cycles of microinstructions consisting of a plurality of binary bits, and generating decode data in response thereto;

step 2) simultaneously receiving the decode data and the microinstructions for controllably clocking latches in response thereto;

step 3) identifying a group of said plurality of binary bits of each of said received microinstructions that have a portion of their control bits set identically to corresponding portions of others of the group of microinstructions;

step 4) determining in a table lookup device whether the binary bits of a received microinstruction is a member of the group of microinstructions that have a portion of their control bits identically set, including the step of for setting a membership bit to "true" if the binary membership bits of the received microinstruction is a member of the group;

step 5) storing a membership bit corresponding to a previously received microinstruction;

step 6) comparing a membership bit corresponding to the received microinstruction with the membership bit corresponding to a previously received microinstruction; and step 7) preventing the clocking of corresponding ones of the plurality of the latches in response to the matching of a pair of "true" membership bits.

4. A method according to claim 3 wherein step 7 includes the step of creating a master table lookup unit.

5. A method for controlling clock gate signals in a microcode instruction signal processor comprising the steps of:

step 1) searching the microcode for a microcode instruction of a given operating cycle wherein the microcode instruction consists of a plurality of binary bits greater than N;

step 2) selecting N bits of the microcode instruction;

step 3) searching a table lookup device containing a stored microcode instruction from a previous operating cycle to look for a match on the N selected bits with the plurality of bits of the microcode instruction of the previous cycle;

step 4) designating and storing temporary control bits for all matches found in step 3;

step 5) comparing the matches with a percentage value in a compare device to determine if the percentage of the matches is above a selected predetermined level.

* * * * *